United States Patent [19]
Lodwig et al.

[11] Patent Number: 5,590,172
[45] Date of Patent: Dec. 31, 1996

[54] METHOD AND SYSTEM FOR TRANSFERRING A RADIOTELEPHONE CALL FROM ONE COVERAGE AREA TO ANOTHER

[75] Inventors: John P. Lodwig, Naperville; Kenneth A. Felix, Crystal Lake, both of Ill.; Charles L. Whittington, Colleyville, Tex.

[73] Assignee: Motorola, Inc., Schaumburg, Ill.

[21] Appl. No.: 639,538

[22] Filed: Apr. 29, 1996

Related U.S. Application Data

[63] Continuation of Ser. No. 85,374, Jul. 2, 1993, abandoned.

[51] Int. Cl.$^6$ .............. H04Q 7/20; H04Q 7/38; H04Q 7/22
[52] U.S. Cl. .............. 379/58; 379/59; 379/60; 379/61; 379/63; 455/33.1; 455/33.2; 455/33.4
[58] Field of Search .............. 379/56, 58, 59, 379/60, 61, 63; 455/11.1, 33.1, 34.1, 33.2, 33.4

[56] References Cited

U.S. PATENT DOCUMENTS

| | | |
|---|---|---|
| 3,663,762 | 5/1972 | Joel, Jr. . |
| 3,819,872 | 6/1974 | Hamrick . |
| 3,898,390 | 8/1975 | Wells et al. . |
| 3,906,166 | 9/1975 | Cooper et al. .......... 455/33.4 |
| 3,913,017 | 10/1975 | Imaseki . |
| 4,475,010 | 10/1984 | Huench et al. . |
| 4,677,656 | 6/1987 | Burke et al. .............. 379/63 |
| 4,704,734 | 11/1987 | Menich et al. . |
| 4,726,014 | 2/1988 | Goldman et al. . |
| 4,771,448 | 9/1988 | Koohgoli et al. .......... 379/60 |
| 4,811,380 | 3/1989 | Spear . |
| 4,866,710 | 9/1989 | Schaeffer ............... 370/95.1 |
| 4,926,421 | 5/1990 | Kawan et al. .......... 370/95.1 |

(List continued on next page.)

FOREIGN PATENT DOCUMENTS

| | | | |
|---|---|---|---|
| 0558041 | 9/1993 | European Pat. Off. ......... 379/59 |
| 0156040 | 9/1984 | Japan ...................... 379/60 |
| 0253327 | 10/1989 | Japan ...................... 455/33.2 |

OTHER PUBLICATIONS

Fluhr, et al., "Control Architecture", Bell System Technical Journal, vol. 58, No. 1, Jan. 1979, pp. 43–69.
Electronic Industries Association Interim Standard, EIA/1S–41.2, Feb. 1988.
TA–NWT–001313, Issue 1, Jul. 1992, pp. 125–138.
Langley, "Telephony's Dictionary, Second Edition", 1986, p. 98.
Beller, "Call Delivery To Portable Telephones Away From Home Using the Local Exchange Network", IEEE, Mar. 1991.

*Primary Examiner*—William Cumming
*Attorney, Agent, or Firm*—Heather L. Creps

[57] ABSTRACT

A method of transferring a user message-conveying radiotelephone call by a subscriber unit from a first radio coverage area, served by a first fixed control unit which is coupled to a wireline telephone switch, to a second radio coverage area served by a second fixed control unit, includes transmitting a directory number, associated with the first fixed control unit and the wireline telephone switch, the directory number identifying a wireline telephone number of the first fixed control unit, from the first fixed control unit to the subscriber unit; storing the transmitted directory number at the subscriber unit; transmitting the stored directory number from the subscriber unit to the second fixed control unit when a need for transfer of the radiotelephone call to the second fixed control unit from the first fixed control unit is determined; calling the transmitted directory number from the second fixed control unit; in response to the calling of the directory number, connecting the second fixed control unit to the first fixed control unit via the wireline telephone switch; and transferring control of the radiotelephone call from the first fixed control unit to the second fixed control unit by dialing the transmitted directory number from the second fixed control unit.

9 Claims, 3 Drawing Sheets

U.S. PATENT DOCUMENTS

| | | | |
|---|---|---|---|
| 5,095,531 | 3/1992 | Ito | 455/33.1 |
| 5,127,042 | 6/1992 | Gillig et al. | 379/59 |
| 5,127,100 | 6/1992 | D'Amico et al. | |
| 5,200,957 | 4/1993 | Dahlin | 370/100.1 |
| 5,202,912 | 4/1993 | Breeden et al. | 379/57 |
| 5,267,261 | 11/1993 | Blakeney, II et al. | 375/205 |
| 5,285,443 | 2/1994 | Patsiokas et al. | 370/29 |
| 5,315,636 | 5/1994 | Patel | 379/58 |
| 5,323,446 | 6/1994 | Kojima et al. | 379/60 |
| 5,329,635 | 7/1994 | Wadin et al. | 455/33.2 |
| 5,384,828 | 1/1995 | Brown et al. | 379/61 |
| 5,392,331 | 2/1995 | Patsiokas et al. | 379/63 |
| 5,430,790 | 7/1995 | Williams | 379/63 |
| 5,450,474 | 9/1995 | Hoflinger | 379/61 |
| 5,467,381 | 11/1995 | Peltonen et al. | 379/58 |

METHOD AND SYSTEM FOR TRANSFERRING A RADIOTELEPHONE CALL FROM ONE COVERAGE AREA TO ANOTHER

This application is a continuation of application Ser. No. 08/085,374, filed Jul. 2, 1993, now abandoned.

BACKGROUND OF THE INVENTION

This invention relates to radiotelephone communication systems in general and more particularly to the method and apparatus of transferring a radiotelephone call by a subscriber unit from one radio coverage area to another radio coverage area.

In radiotelephone systems having more than one radio coverage area, it is well known to coordinate the service provided in the radio coverage areas by enabling a radiotelephone call established in a first of the radio coverage areas to be maintained as the subscriber unit moves to a second radio coverage area. This transferring of the call service is conventionally known as handoff, handover, or link transfer.

Cellular radiotelephone systems are known for their ability to maintain a telephone call over a wide geographic area by handing off a telephone call between radio coverage areas (or "cells"). Handoff techniques used in such cellular systems have been documented in the literature (see "Control Architecture" by Fluhr, et al., the Bell System Technical Journal Vol. 58, No. 1, Jan. 1979, pp. 43–69). Generally in handing off a call from one cell to another, it is necessary for the system to determine which cell has the best communication path to the subscriber unit and then instruct the subscriber unit as to which frequency it should tune in order to maintain the conversation into the new, target cell. More recently, the subscriber unit has been taking a more active role in the handoff decision-making process by providing information to the fixed network regarding which communication channels are suitable for continuing the call in a target cell (see, for exam_pie, U.S. Pat. No. 5,127,100).

In the more recently developed systems in which the subscriber unit participates in the handoff determination, the fixed system equipment must smoothly and efficiently connect the telephone call from a target cell site to the call in progress. It has been suggested in Electronic Industries Association specification IS-41 that the wireline telephone switch which initially receives and processes the radiotelephone call act as an anchor point for all future handoff activities. The anchor wireline telephone switch then connects the call to the radio subscriber unit, regardless of the subscriber unit's cell location. This plan, however, requires the wireline telephone switches to be specifically designed to handle wireless telephone services. Such use of wireline telephone switches is inefficient due to the substantial amount of overhead which must be dedicated to radiotelephone processing rather than to switch interconnection.

It has also been suggested that a Class 5 telephone switch which supports a wireline feature commonly termed "barge-in" can be used to implement handoff. Barge-in allows a wireline subscriber C to send a Call Identity message defining a call in progress between wireline subscribers A and B to an ISDN supporting Class 5 switch to cause all three parties to be connected via a conference bridge. Barge-in implementation for wireless handoff, however, requires ISDN capability and consistency between Class 5 switches. Moreover, handoff using a barge-in feature is limited to the Class 5 switch in which the call was originated so that handoff occurring between radio coverage areas supported by different Class 5 switches cannot occur using conventional barge-in techniques.

Therefore, it would be desirable to employ standard wireline telephone switches to control call switching functions without regard to whether the calls are wireline or wireless calls and to route call handoff between various other standard wireline telephone switches. The anchor point radiotelephone handoff process should be maintained as a radiotelephone system function which is compatible with these standard wireline telephone switches.

SUMMARY OF THE INVENTION

According to an aspect of the present invention, a method of transferring a user message-conveying radiotelephone call by a subscriber unit from a first radio coverage area, served by a first fixed control unit which is coupled to a wireline telephone switch, to a second radio coverage area served by a second fixed control unit, includes transmitting a directory number, associated with the first fixed control unit and the wireline telephone switch, the directory number identifying a wireline telephone number of the first fixed control unit, from the first fixed control unit to the subscriber unit; storing the transmitted directory number at the subscriber unit; transmitting the stored directory number from the subscriber unit to the second fixed control unit when a need for transfer of the radiotelephone call to the second fixed control unit from the first fixed control unit is determined; calling the transmitted directory number from the second fixed control unit; in response to the calling of the directory number, connecting the second fixed control unit to the first fixed control unit via the wireline telephone switch; and transferring control of the radiotelephone call from the first fixed control unit to the second fixed control unit by dialing the transmitted directory number from the second fixed control unit.

DESCRIPTION OF A PREFERRED EMBODIMENT

Figure 1:
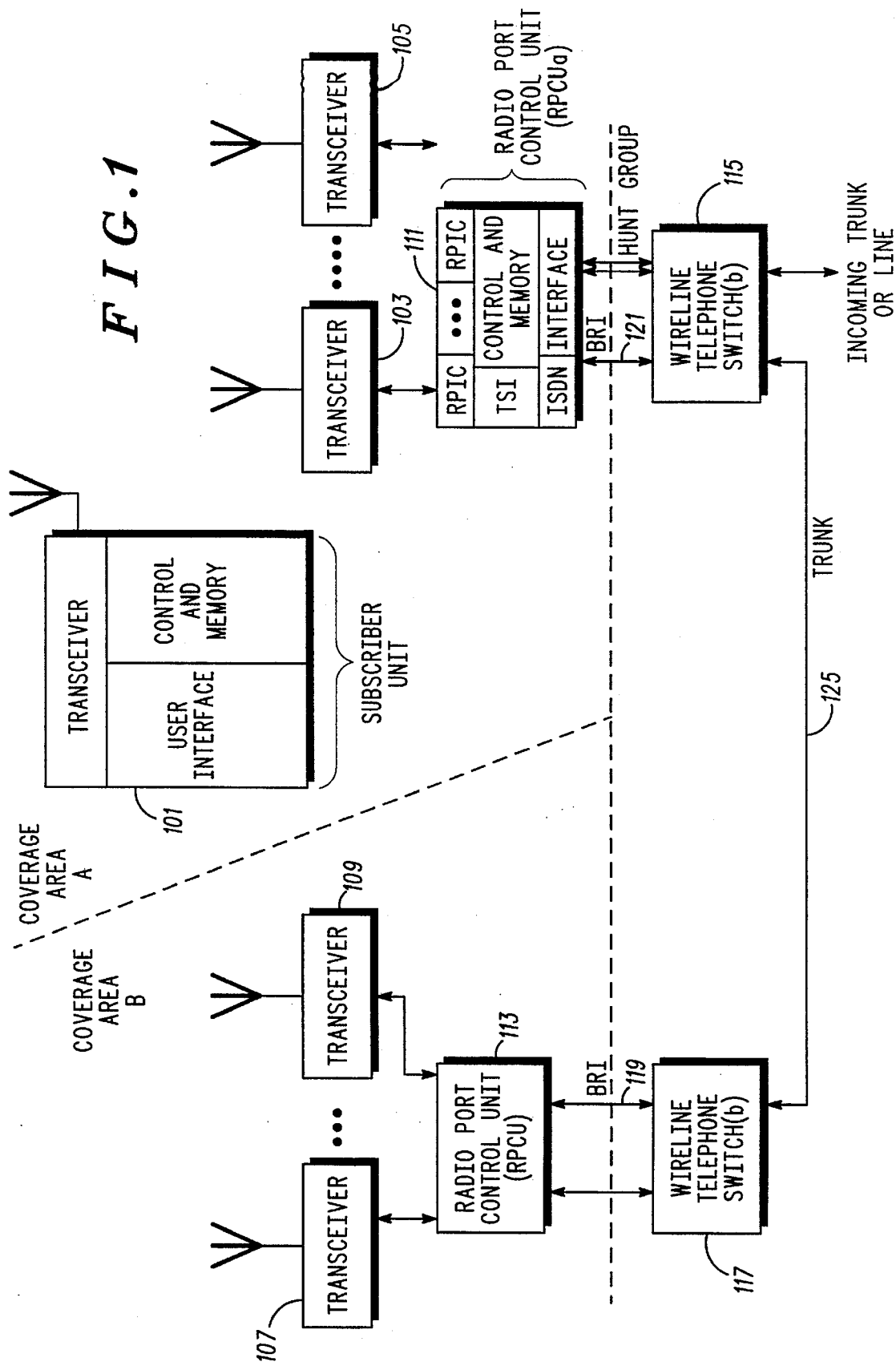
FIG. 1 is a block diagram of a radiotelephone system illustrating two coverage areas and which may employ the present invention.

A system which may advantageously use the present invention is shown in the block diagram of FIG. 1. The need to employ conventional wireline telephone switches while maintaining a call anchor point for radiotelephone handoff is met by the system of FIG. 1 when employing the present invention. The radiotelephone system of the preferred embodiment is a digital radio system conveying voice or data messages in assigned timeslots of a TDMA implementation from the subscriber unit to the fixed transceiver and in fixed timeslots of a TDM implementation from the fixed transceiver to the subscriber unit on separate radio frequency channels. The system need not be so limited to utilize the present invention, as single radio frequency systems, code division multiple access systems, analog systems, and other like systems may equally benefit from the advantages of the present invention. A subscriber unit 101 includes the functions of a transceiver, a user interface, and control and memory functions. Such a subscriber unit is similar to other TDM/TDMA mobile and portable radiotelephone equipment being used in digital radiotelephone systems. The fixed portion of the system is illustrated as being divided into coverage area A and coverage area B, which are essentially determined by the radio transmission path between the subscriber unit 101 and the fixed transceivers. In coverage area A, two fixed transceivers, transceiver 103 and transceiver 105, are shown, although as few as one transceiver may be used in a coverage area. In coverage area B, two transceivers, 107 and 109, are shown.

Control of the radio equipment, other subscriber units, and basic radiotelephone system operation is provided by a fixed control unit 111, which, in the preferred embodiment is termed a radio port control unit (RPCU). A typical radio port control unit includes the functions of an ISDN interface coupled to a timeslot interface coupled to one or more radio port interface cards (RPIC), all under the control of control and memory functions. An RPCU which may be utilized in the present invention is similar to model SC9600 available from Motorola, Inc. but may not need certain built-in features like voice coding. An equivalent RPCU controls the functions of the radiotelephone system in coverage area B. (ISDN—BRI (basic rate interface) or PRI (primary rate interface)—is not required for handoff for the present invention, but is desirable. However, a digital connection, end to end—RPCU to RPCU and switch to switch—is preferred.)

As shown in FIG. 1, two wireline telephone switches, 115 and 117, are coupled to RPCU 111 and RPCU 113, respectively. Switches 115 and 117 may be standard ESS Class 5 end offices, e.g. AT&T #5, Northern Telecom DMS 100, or other standard digital switches which are typically used to control and connect conventional wireline instruments. As a result of the use of the present invention, these wireline telephone switches do not need special modification in order to perform their functions for a radiotelephone system. In this way, a conventional wireline telephone switch may be used for both wireline and wireless switching and connect to the conventional wireline network. Although only two wireline telephone switches 115 and 117 are shown in FIG. 1, the invention is unbounded by any limiting number of switches. Conversely, it is anticipated that the present invention will also be employed in wireline and radiotelephone systems in which more than one RPCU will be coupled to a single wireline telephone switch.

As subscriber unit 101 moves about engaged in the call, it also monitors the signal quality of neighboring RPCUa by monitoring the control timeslot transmissions of the neighboring RPCUs. As the subscriber unit 101 moves, for example, from coverage area A into coverage area B, it finds that the quality of the radio signal received and transmitted between the subscriber unit 101 and fixed transceiver 103 begins to deteriorate. In this instance, the subscriber unit 101 determines the quality of a radio signal which would be transmitted between the subscriber unit 101 and transceiver 109, for example, would be more appropriate than the current radio channel between the subscriber unit 101 and the fixed transceiver 103. The control and memory functions of the subscriber unit 101, upon detection of a deteriorating radio quality signal, cause the subscriber unit transceiver (which in the preferred embodiment is a frequency agile transceiver) during one of its timeslots which are not used for its transmission/reception to retune to the radio frequency transmission from transceiver 109. A measurement of the radio channel quality, for example a measurement of signal to interference ratio, is performed and a decision is made by the subscriber unit 101 to retune to the frequency of the radio channel being used by transceiver 109. (If the radio channel frequency of transceiver 109 is the same as and coordinated with the radio channel frequency of transceiver 103, there is no need to retune the transceiver of the subscriber unit 101. Subscriber unit 101 need only check the appropriate timeslot in use by transceiver 109 for control purposes.) Once the subscriber unit 101 makes the determination that a handoff is necessary to maintain call quality, it suspends transmission to the currently serving transceiver in coverage area A (with a suspend transmission instruction to RPCUa) and seizes an unused timeslot (marked idle in the message header field of transmission from RPCUb via a transceiver coupled to it) with a transmission of a handoff request message to RPCUb on this timeslot. This handoff request notifies the target coverage area to establish alternative call routing by the fixed equipment so that handoff might occur. The subscriber unit then returns to the timeslot of the currently serving RPCUa for final instructions to use the target timeslot on the radio channel associated with RPCUb. This type of handoff has the advantage that should a connection between the subscriber unit and RPCUa be lost after the handoff request is made to RPCUb, the subscriber unit may return to the target coverage area timeslot and wait for the call to be reconnected there.

Figure 2:
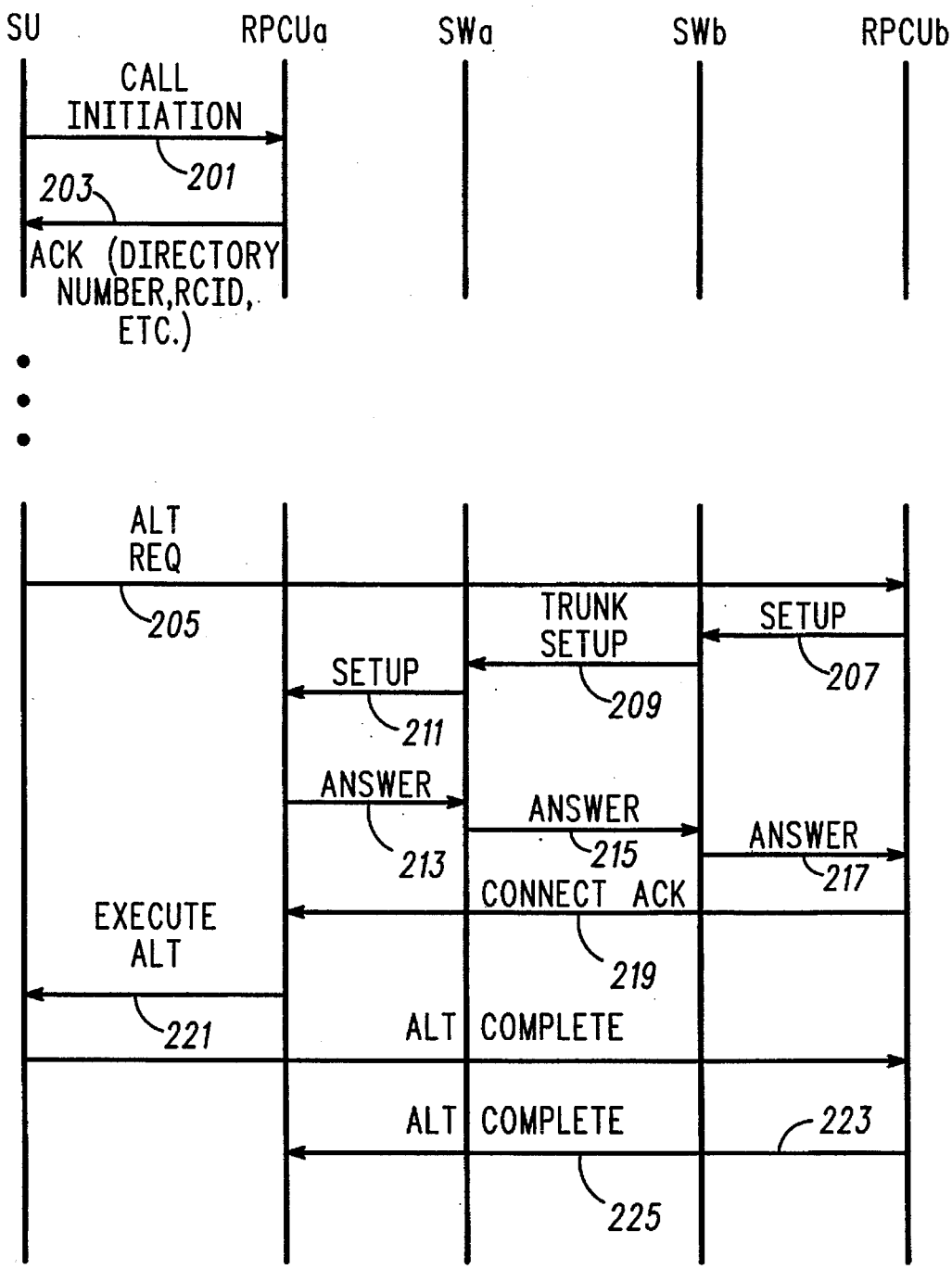
FIG. 2 is a diagram illustrating the flow of link transfer establishing messages between some of the elements of the radiotelephone system which may employ the present invention.

The process employed to realize the handoff is shown in FIG. 2. There, it is shown that the subscriber unit (SU) has initiated a new call 201 to the radio port control unit of coverage area A (RPCUa) and that RPCUa, finding that a radio channel and timeslot was available to handle the call, responded 203 by downloading to the subscriber unit (SU) call setup information, including a directory number and a radio call identifier (RCID) which is a unique call record related to this call and this subscriber unit and maintained in RPCUa. It is a feature of the present invention that the directory number 203 be a telephone number which uses the geographical number associated with the office code(s) of the wireline telephone switch which is coupled to RPCUa and then either passes that number to RPCUa (trunk call) or selects a specific groups of lines or trunks that the RPCUa may identify with a request for a vertical service, e.g. handoff. In the preferred embodiment, the directory number is in the form of NNN-XXXX but may also include area codes where necessary. All calls initiated between RPCUa and a subscriber unit use the same directory number to identify RPCUa. It is the RCID that allows the RPCUa to distinguish between the various RPCUa active call records. After the directory number and call set-up information is transferred 203, voice or data messages may then conventionally be exchanged between the subscriber unit (SU) and the RPCUa and the other party by way of the wireline telephone switch 115 coupled to RPCUa (SWa). Although the directory number is conveyed to the subscriber unit (SU) upon the initiation of the radiotelephone call in the preferred embodiment, alternative times of conveyance, for example continuous transmission of the directory number during a control timeslot, may be employed in realizing the present invention.

When the subscriber unit (SU) determines that the radio signal quality from RPCUb (the radio port control unit 113 serving coverage area B) provides a more appropriate signal quality, the subscriber unit (SU) seizes the idle traffic channel of RPCUb and sends a Link Transfer request (ALT REQ) 205 to RPCUb. The ALT REQ includes the RPCUa directory number and the radio call identifier (RCID) that is maintained in RPCUa. In response, RPCUb sends a set up message 207 to the wireline telephone switch 117 coupled to RPCUb (SWb) via a connecting basic rate interface (BRI) subscriber loop 119. (Alternatively, this connecting link may be a primary rate interface (PRI) trunk or other digital trunk connection.) This request looks like a new call input to telephone switch SWb, in which the RPCUa directory number is the called party. Wireline telephone switch 117 (SWb) then seizes a trunk to the wireline telephone switch 115 (SWa) based on this information and sends a trunk setup 209. Such interswitch communication uses standard DS1 trunk signaling, either robbed bit signaling (that is, stealing the least significant bit in each DS0 timeslot at the rate of 1 out of every 6 frames, or by common channel signaling, e.g. Signaling System Number 7). Once telephone switch SWa receives the interswitch trunk setup 209, it then connects to RPCUa via either a BRI, PRI, or robbed bit DS1 trunk connection. RPCUa recognizes that the request for service on the terminal number associated with the request indicates a request for some vertical service, e.g. handoff. RPCUa answers the call request. Answer supervision is passed through SWa to SWb to RPCUb. It is at this time the transfer of information related to the call, e.g. the RCID is transmitted from RPCUb to RPCUa. This process involves using idle DS0 information bits in the DS0 of choice to send the messages RPCUb to RPCUa. Conventionally, the DS0 timeslot in a DS1 format has a minimum of 7 bits available for Pulse Code Modulation (PCM) that is equal to a 56 kb/s data/voice transmission rate. With common channel signaling, all 8 bits of each DS0 are available for a data/voice transmission rate of 64 kb/s. Since the voice/data in question does not exceed 32 kb/s for non-multiplexed traffic channels, 4 or fewer of the 8 bits of the DS0 are used for the basic data/voice call (see FIG. 4). This leaves a minimum of 3 bits of the 8 bits available for other uses, e.g. the inband data channel for communications between RPCUa and RPCUb. At a minimum, this is equivalent to an 24 kb/s data channel for every RPCUb to RPCUa handoff request. The format of the data exchange can be LAPb, LAPd, SS7, Q.931, or any other basic protocol used in standard data transfer operations. However, the need for digital connection end to end is thus demonstrated in that without this type of connection, the inband data link could not be secured and would require out of band protocols, e.g. IS41 over X25 or SS7 to communicate RPCUb to RPCUa.

RPCUb sends a message to RPCUa that contains, at a minimum in the preferred embodiment, call control information including the RCID associated with the initial call set-up and the directory number off RPCUb (for audit and billing purposes). RPCUa then responds to RPCUb with information related to privacy (encryption information) and then sends a command to execute the handoff to the current transceiver and to the transceiver of RPCUb (which passes messages to the transceiver under its control). (This process can also be implemented using a three party connection.) After the handoff instruction has been sent to the SU, RPCUa drops the connection between its radio transceiver And the subscriber unit (SU) and converses via the connection through RPCUb. At this time a dedicated connection exists between RPCUa and RPCUb via trunk 125.

Figure 4:
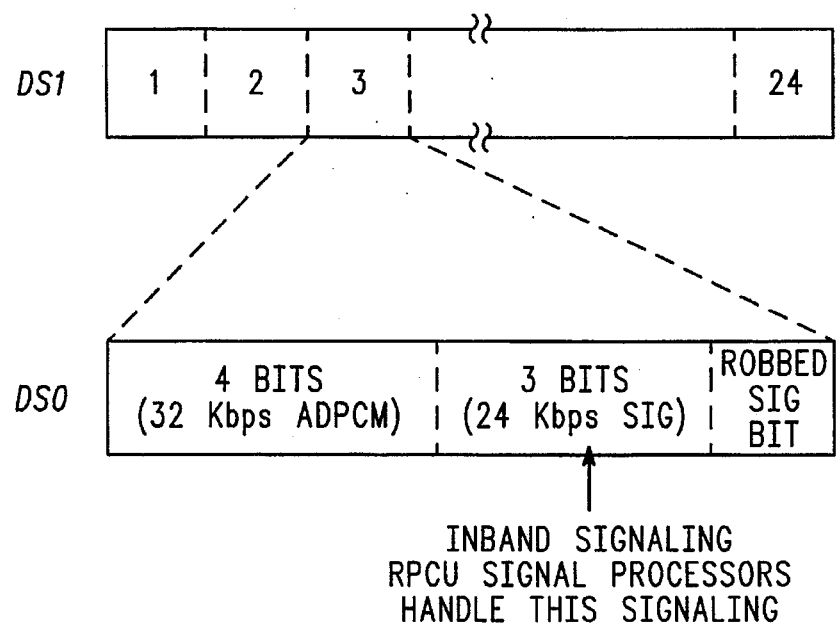
FIG. 4 is a message format diagram which may be used in the present invention.

RPCUb sends a connect acknowledge (ACK) 219 to RPCUa using in band signaling. SWa and SWb are oblivious to the transmission of this message because the wireline switches do not monitor this field. The DS1 format, including the in-band signaling bits are shown in FIG. 4. The connect acknowledge 219 message also contains the call control RCID parameter fields.

To conclude the handoff, RPCUa sends an execute-ALT message 221 to the subscriber unit (SU). The subscriber unit (SU) receives the message and moves to the channel and timeslot and sends an ALT-complete message 223 to RPCUb via the currently used radio channel. RPCUb relays the fact it received an ALT-complete message 225 to RPCUa via in band signaling over trunk 125. RPCUa drops the radio channel and timeslot connection to the subscriber unit out of a three party connection it set up. RPCUa however, retains the connection to RPCUb via trunk 125. RPCUa remains the anchor point of the call for the duration of the call even if the subscriber unit moves to another coverage area (not shown). Thus, the anchor point of the link transfer is retained within the radiotelephone system while maintaining compatibility with a standard wireline telephone switch. A similar process would be followed as described above for additional link transfers but once the handoff (link transfer) to the new coverage area is completed, the connection to RPCUb is dropped in favor of the new connection.

Figure 3:
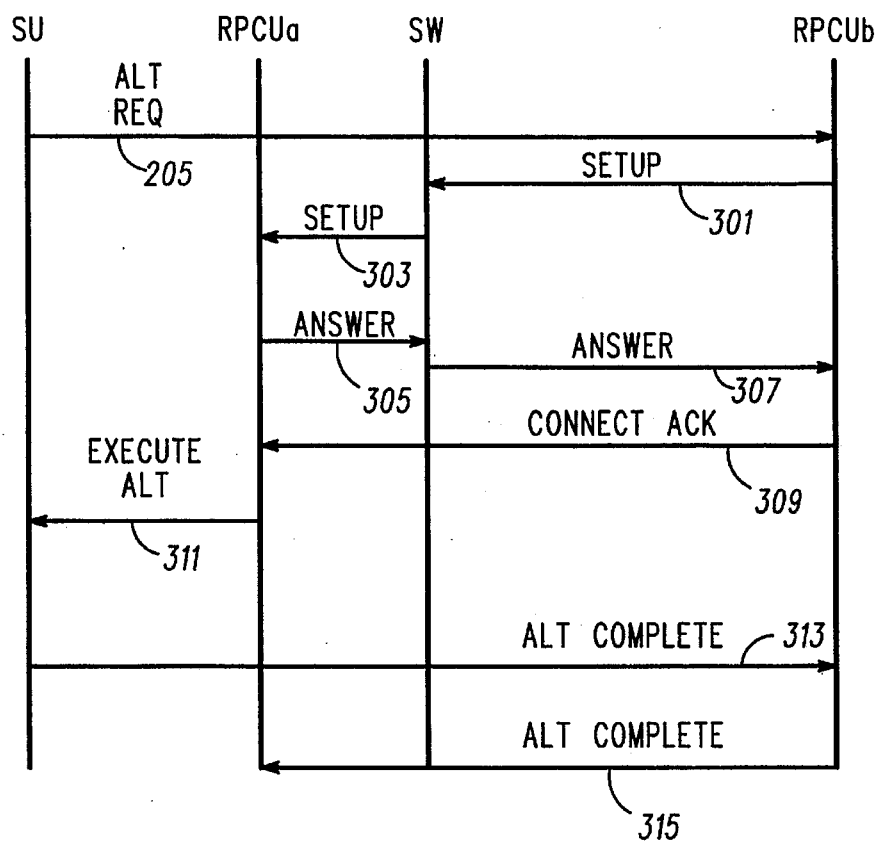
FIG. 3 is a diagram illustrating an alternative flow of link transfer establishing messages which may be employed in the present invention.

Referring now to FIG. 3, it can be seen that a link transfer between RPCUs which are coupled to the same wireline telephone switch employ a process similar to that of FIG. 2 except that there is no need to set up a trunk connection between the wireline telephone switches. Only BRI, PRI, or other local loop connections need to be set up between RPCUa, RPCUb, and the single conventional wireline telephone switch in this alternative embodiment. When the ALT request 205 is received by RPCUb from the subscriber unit (SU), RPCUb transmits a set up message 301 to its serving wireline telephone switch (SW). The wireline telephone switch SW then initiates a call set up message 303 to RPCUa. RPCUa transmits an answer message 305 to the wireline telephone switch SW which in turn conveys the answer message 307 via a BRI to RPCUb. The connect acknowledge message 309 is transmitted to RPCUa from RPCUb using in band signaling. In response, RPCUa transmits an execute ALT message 311 to the subscriber unit SU via the radio channel and timeslot in use. The subscriber unit SU then transmits an ALT complete message 313 to the RPCUb on its new radio channel and timeslot. RPCUb then informs RPCUa of the completion of the handoff with an ALT complete message 315 via in band signaling. RPCUa then drops the radio channel portion of the three way call it set up.

A diagrammatic representation of the frame structure used in communication between the wireline telephone switches 115 and 117 is shown in FIG. 4. In the preferred embodiment, the DS1 frame conveys twenty-four timeslots at 56 Kilobits per second. Each eight bit timeslot (a DS0 timeslot) of the twenty-four DS1 slots conveys 4 bits of ADPCM effectively at 32 Kilobits per second, three bits of signaling effectively at 24 Kilobits per second and one robbed signaling bit. When a single DS0 slot is used to carry one call using 32 Kilobits per second ADPCM coded speech, it leaves four bits unused for the speech. The least significant of the remaining bits is used for standard bit robbed inter-office, non SS7 trunk signaling. This leaves three bits. These three bits are, in the present invention used to provide in band signaling between RPCUs. These messages are not interpreted or intercepted by the wireline telephone switch but are instead effectively end-to-end in band signaling between the RPCUs. In other words, they form a direct RPCU to RPCU link.

We claim:

1. A method of transferring a user message-conveying radiotelephone call by a subscriber unit from a first radio coverage area, served by a first fixed control unit which is coupled to a wireline telephone switch, to a second radio coverage area served by a second fixed control unit, the method comprising the steps of:

transmitting a directory number, associated with the first fixed control unit and the wireline telephone switch, the directory number identifying a wireline telephone number of the first fixed control unit, from the first fixed control unit to the subscriber unit;

storing the transmitted directory number at the subscriber unit;

transmitting the stored directory number from the subscriber unit to the second fixed control unit when a need for transfer of the radiotelephone call to the second fixed control unit from the first fixed control unit is determined;

dialing the transmitted directory number from the second fixed control unit;

in response to the dialing of the directory number, connecting the second fixed control unit to the first fixed control unit via the wireline telephone switch; and transferring control of the radiotelephone call from the first fixed control unit to the second fixed control unit by dialing the transmitted directory number from the second fixed control unit.

2. A method of hending off a call between a subscriber unit and a first base station, which is coupled to a wireline telephone switch, to a second base station, the method comprising the steps of:

transmitting a directory number, the directory number identifying a wireline telephone number of the first base station, from the first base station to the subscriber unit;

storing the transmitted directory number at the subscriber unit;

transmitting the stored directory number from the subscriber unit to the second base station when transfer of the call to the second base station from the first base station is to be executed;

calling, from the second base station, the transmitted directory number;

coupling via the wireline telephone switch the call from the first base station to the second base station;

handing of the call to the subscriber unit from the first base station to the second base station;

instructing, by the first base station, the subscriber unit to communicate with the second base station;

transmitting from the second base station to the first base station, via the wireline telephone switch, an acknowledgment that the subscriber unit commenced communication with the second base station; and continuing by the first base station to be responsive to the second base station via the wireline telephone switch throughout a duration of the call.

3. The method according to claim 1, wherein the need for transferring the radiotelephone call comprises measuring, by the subscriber unit, a quality of a radio frequency channel associated with the second fixed control unit.

4. The method according to claim 2, wherein the directory number is transmitted to the subscriber unit in response to initiation of the call.

5. A method for transferring a radio-frequency communication from a first channel associated with a first fixed control unit to a second channel associated with a second fixed control unit, the method comprising the steps of:

transmitting from the first fixed control unit to a mobile subscriber unit a first message identifying a wireline telephone number of the first fixed control unit;

receiving the radio frequency communication on the first channel by the mobile subscriber unit;

determining by the mobile subscriber unit a quality of the radio-frequency communication on the first channel;

sending, in response to the determination, a second message from the mobile subscriber unit to the second fixed control unit requesting transfer of the radio-frequency communication to the second channel, the second message identifying the telephone number of the first fixed control unit;

addressing, by the second fixed control unit, a call setup message including the telephone number of the first fixed control unit to a first wireline telephone switch in the geographical area of the first fixed control unit;

establishing a wireline communication channel between the second fixed control unit and the first fixed control unit;

contacting of the first fixed control unit by the second fixed control unit;

instructing, by the first fixed control unit in response to the contact of the second fixed control unit, the mobile subscriber to communicate on the second channel;

transmitting, via the wireline communication channel, an acknowledgment from the second fixed control unit to the first fixed control unit that the mobile subscriber unit commenced communication on the second channel; and continuing by the first fixed control unit to be responsive to the second fixed control unit via the wireline communication channel throughout a duration of the radio-frequency communication.

6. The method according to claim 5, further comprising the steps of:

receiving the call setup message by a second wireline telephone switch in the geographical area of the second fixed control unit; and forwarding the call setup message by the second wireline telephone switch to the first wireline telephone switch.

7. The method according to claim 6, wherein the wireline communication channel is established between the first wireline telephone switch and the second wireline telephone switch.

8. The method according to claim 5, wherein the first message identifies the radio frequency communication.

9. The method according to claim 5, further comprising the step of:

maintaining a record of the radio frequency communication by the first fixed control unit.

* * * * *